US012085813B2

(12) United States Patent
Wu

(10) Patent No.: US 12,085,813 B2
(45) Date of Patent: Sep. 10, 2024

(54) ARRAY SUBSTRATE, LIQUID CRYSTAL DISPLAY PANEL, AND DISPLAY DEVICE

(71) Applicant: WUHAN CHINA STAR OPTOELECTRONICS TECHNOLOGY CO., LTD., Hubei (CN)

(72) Inventor: Yunfei Wu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/597,949

(22) PCT Filed: Jan. 21, 2022

(86) PCT No.: PCT/CN2022/073088
§ 371 (c)(1),
(2) Date: Jul. 20, 2023

(87) PCT Pub. No.: WO2023/133921
PCT Pub. Date: Jul. 2, 2023

(65) Prior Publication Data
US 2024/0045277 A1 Feb. 8, 2024

(30) Foreign Application Priority Data
Jan. 12, 2022 (CN) .......................... 202210031535.X

(51) Int. Cl.
G02F 1/1343 (2006.01)
G02F 1/1362 (2006.01)

(52) U.S. Cl.
CPC .. *G02F 1/134309* (2013.01); *G02F 1/136222* (2021.01); *G02F 1/136286* (2013.01)

(58) Field of Classification Search
CPC ......... G02F 1/134309; G02F 1/136222; G02F 1/136286
See application file for complete search history.

(56) References Cited

U.S. PATENT DOCUMENTS

| 6,133,968 A | 10/2000 | Asada |
| 2011/0187672 A1 | 8/2011 | Hung |
| 2016/0026043 A1* | 1/2016 | Okazaki ............ G02F 1/134309 349/144 |

FOREIGN PATENT DOCUMENTS

| CN | 1696803 A | 11/2005 |
| CN | 101122723 A | 2/2008 |

(Continued)

OTHER PUBLICATIONS

Chinese Office Action issued in corresponding Chinese Patent Application No. 202210031535.X dated Apr. 18, 2023, pp. 1-9.

(Continued)

*Primary Examiner* — Mariam Qureshi
(74) *Attorney, Agent, or Firm* — PV IP PC; Wei Te Chung

(57) ABSTRACT

An array substrate, a liquid crystal display panel, and a display device are provided. The array substrate includes a first electrode. The first electrode includes a first waist and a second waist. A shortest distance from the first waist to the second waist is defined as d1, and a distance from an end of the first side wall away from the second side wall to an end of the third side wall away from the fourth side wall is defined as d2, a distance from an end of the second side wall away from the first side wall to an end of the fourth side wall away from the third side wall is defined as d3, and d1<d2 and d1<d3.

15 Claims, 12 Drawing Sheets

(56) References Cited

FOREIGN PATENT DOCUMENTS

| | | | |
|---|---|---|---|
| CN | 201251666 | Y | 6/2009 |
| CN | 102147540 | A | 8/2011 |
| CN | 102253553 | A | 11/2011 |
| CN | 103869555 | A | 6/2014 |
| CN | 204302631 | U | 4/2015 |
| CN | 105388655 | A | 3/2016 |
| CN | 105892171 | A | 8/2016 |
| CN | 106502009 | A | 3/2017 |
| CN | 107632470 | A | 1/2018 |
| CN | 108333842 | A | 7/2018 |
| CN | 108957873 | A | 12/2018 |
| CN | 109100895 | A | 12/2018 |
| CN | 109416489 | A | 3/2019 |
| CN | 112859459 | A | 5/2021 |
| CN | 215067644 | U | 12/2021 |

OTHER PUBLICATIONS

International Search Report in International application No. PCT/CN2022/073088, mailed on Oct. 10, 2022.
Written Opinion of the International Search Authority in International application No. PCT/CN2022/073088, mailed on Oct. 10, 2022.

* cited by examiner

ARRAY SUBSTRATE, LIQUID CRYSTAL DISPLAY PANEL, AND DISPLAY DEVICE

FIELD OF INVENTION

The present application relates to the field of virtual reality technologies, and more particularly to a to an array substrate, a liquid crystal display panel, and a display device.

BACKGROUND OF INVENTION

The development of virtual reality (VR) technology in display technology is relatively competitive. A display panel of a VR display device has higher response speed and higher resolution (generally around 1000 PPI). At present, electrodes of the display panel of the VR display device are comb-shaped, and a better response time can be obtained. However, a transmittance of comb electrodes is relatively low.

Technical Problem

The transmittance of the comb electrodes is relatively low.

SUMMARY OF INVENTION

In view of this, the present application provides an array substrate with better response time and higher transmittance.

The present application further provides a liquid crystal display panel including the above electrode.

The present application further provides a real display device including the above-mentioned liquid crystal display panel.

In order to solve the above-mentioned problems, the technical solutions provided by the present application are as follows:

An array substrate comprises a driving circuit layer and a first electrode located on the driving circuit layer; wherein the driving circuit layer comprises a plurality of scan lines and a plurality of data lines, and the first electrode is located in a sub-pixel area surrounded by the plurality of the scan lines and the plurality of the data lines; wherein an extension direction of the scan lines is defined as a first direction, and an extension direction of the data lines as a second direction; wherein the first electrode further comprises a solid part; wherein the solid part further comprises:

A first side wall and a second side wall; wherein the first side wall intersects with an end of the second side wall to form a first waist; and A third side wall and a fourth side wall; wherein the third side wall intersects with an end of the fourth side wall to form a second waist;

Wherein a shortest distance from the first waist to the second waist is defined as d1, a distance from an end of the first side wall away from the second side wall to an end of the third side wall away from the fourth side wall is defined as d2, a distance from an end of the second side wall away from the first side wall to an end of the fourth side wall away from the third side wall is defined as d3, and d1<d2 and d1<d3.

In an optional embodiment of the present application, the solid part comprises a first surface disposed parallel to and away from the driving circuit layer, the first side wall, the second side wall, the third side wall, and the fourth side wall are respectively connected to the first surface and are on different planes from the first surface;

On the first surface, the first side wall and the second side wall are defined to intersect at a point A, the third side wall and the fourth side wall are defined to intersect at a point B, and an angle between a line connecting the point A and the point B and the first direction is 0 degrees.

In an optional embodiment of the present application, the first electrode further comprises a cavity in the solid part, and the first side wall, the second side wall, the third side wall, and the fourth side wall are inner walls of the cavity.

In an optional embodiment of the present application, the solid part further comprises an outer side wall, the outer side wall is arranged around the first side wall, the second side wall, the third side wall, and the fourth side wall, and the outer side wall is an outer wall of the solid part.

In an optional embodiment of the present application, an angle between the first side wall and the second direction is defined as a first inclination angle $\theta_1$, an angle between the second side wall and the second direction is defined as a second inclination angle $\theta_2$, an angle between the third side wall and the second direction is defined as a third inclination angle $\theta_3$, an angle between the fourth side wall and the second direction is defined as a fourth inclination angle $\theta_4$, and value ranges of $\theta_1$, $\theta_2$, $\theta_3$, and $\theta_4$ are all 3 degrees to 35 degrees.

In an optional embodiment of the present application, the value ranges of $\theta_1$, $\theta_2$, $\theta_3$, and $\theta_4$ are all 5 degrees to 15 degrees.

In an optional embodiment of the present application, $\theta_1=\theta_3$ and $\theta_2=\theta_4$.

In an optional embodiment of the present application, $\theta_1=\theta_2=\theta_3=\theta_4$.

In an optional embodiment of the present application, $\theta_1 \neq \theta_2$ and $\theta_3 \neq \theta_4$.

In an optional embodiment of the present application, the first side wall is symmetrical with the third side wall, and the second side wall is symmetrical with the fourth side wall.

In an optional embodiment of the present application, on the first surface, the first side wall and the second side wall are defined to intersect at the point A, the third side wall and the fourth side wall are defined to intersect at the point B, and an angle between the line connecting the point A and the point B and the first direction is not equal to 0 degrees.

In an optional embodiment of the present application, the solid part further comprises:

A fifth side wall connected to the end of the first side wall away from the second side wall; and A sixth side wall, connected to the end of the third side wall away from the fourth side wall;

An angle between the fifth side wall and the second direction is defined as a fifth inclination angle $\beta_1$, an angle between the sixth side wall and the second direction is a sixth inclination angle $\beta_2$, and value ranges of $\beta_1$ and $\beta_2$ are both 0 degrees to 90 degrees.

In an optional embodiment of the present application, the value ranges of $\beta_1$ and $\beta_2$ are both 45 degrees to 60 degrees.

In an optional embodiment of the present application, the solid part further comprises:

A seventh side wall connected to the fifth side wall and the sixth side wall, respectively; and An eighth side wall connected to the second side wall and the fourth side wall, respectively;

Wherein the eighth side wall and the seventh side wall are located at two ends of the solid part.

In an optional embodiment of the present application, the array substrate further comprises a substrate and a second electrode opposite to the first electrode, the second electrode is located within the driving circuit layer or on the driving circuit layer, the driving circuit layer is located on the substrate, and the second electrode is located between the substrate and the first electrode.

The present application further provides a liquid crystal display panel including liquid crystal and a color filter substrate, the liquid crystal display panel further includes the above-mentioned array substrate, and the liquid crystal is located between the color filter substrate and the array substrate.

The present application further provides a display device comprising the above-mentioned liquid crystal display panel.

Beneficial Effect

In the electrode, the liquid crystal display panel, and the display device provided by the present application, 1) a shape of the electrode is designed such that the solid part of the electrode includes the first side wall, the second side wall, the third side wall, and the fourth side wall. On the first surface, the first side wall and the second side wall intersect at the point A, and the third side wall and the fourth side wall intersect at the point B. The distance from the point A to the point B is smaller than the distance between the ends of the first side wall and the third side wall away from the point A and the point B and is smaller than the distances from the ends of the second side wall and the fourth side wall away from the point A and the point B. Accordingly, dimensions at the intersection of the first side wall and the second side wall and the intersection of the third side wall and the fourth side wall are relatively shrunk. This forms a fish-like electrode. An inactive electric field component and an electric field disturbance area can be reduced by changing the shape of the first electrode. In turn, an area of a dark area of the display is reduced, so as to improve a transmittance while taking into account the response time. 2) Since the response time decreases with the increase of the electrode inclination angle, the transmittance first increases and then decreases with the increase of the electrode inclination angle. Therefore, setting the value of the inclination angle of the first electrode between 3 degrees and 35 degrees can not only improve the transmittance of the display panel, but also have a better response time. This meets the requirements of the VR display device. 3) When the first electrode provided in the present application is a pixel electrode, the waist of the electrode shrinks. Thus, the distance between two adjacent electrodes is increased, thereby reducing the risk of crosslinking of adjacent electrodes during exposure and development process.

DESCRIPTION OF DRAWINGS

In order to more clearly describe the technical solutions in the embodiments of the present application, the following will briefly introduce the drawings that need to be used in the description of the embodiments. The drawings in the following description are only some embodiments of the application. For those skilled in the art, without creative work, other drawings can be obtained based on these drawings.

DETAILED DESCRIPTION OF PREFERRED EMBODIMENTS

Figure 1:
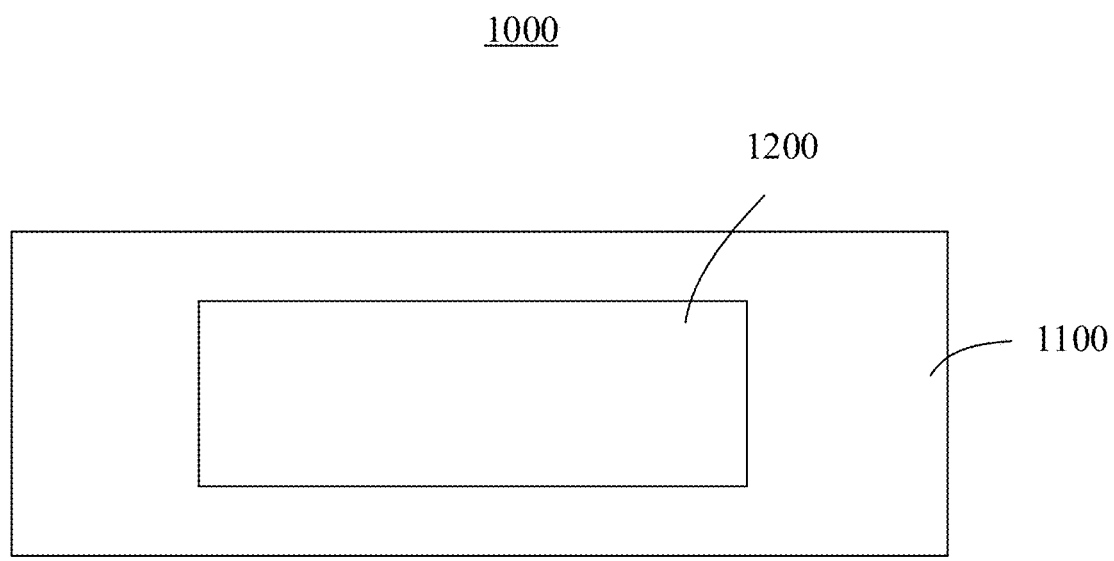
FIG. 1 is a schematic block diagram of a virtual reality display device according to a preferred embodiment of the present application.

The technical solutions in the embodiments of the present application will be clearly and completely described below in conjunction with the drawings in the embodiments of the present application. Obviously, the described embodiments are only a part of the embodiments of the present application, rather than all the embodiments. Based on the embodiments in this application, all other embodiments obtained by those skilled in the art without creative work shall fall within the protection scope of this application.

In the description of the present application, it should be understood that the orientation or positional relationship indicated by the terms "upper", "lower" and the like is based on the orientation or positional relationship shown in the accompanying drawings. This is only for ease of describing the application and to simplify the description. It is not indicated or implied that the referred device or element must have a particular orientation, be constructed and operate in a particular orientation. Therefore, it should not be construed as a limitation on this application. In addition, the terms "first" and "second" are only used for descriptive purposes, and should not be construed as indicating or implying relative importance or implying the number of indicated technical features. Thus, features defined as "first", "second" may expressly or implicitly include one or more of said features. In the description of this application, "plurality" means two or more, unless expressly and specifically defined otherwise.

The application may repeat reference numerals and/or reference letters in different implementations for the purpose of simplicity and clarity, and does not in itself indicate a relationship between the various implementations and/or arrangements discussed.

An electrode, a liquid crystal display panel, and a virtual reality display device provided by the present application will be described in detail below with reference to specific embodiments and accompanying drawings.

Referring to FIG. 1, the present application further provides a display device 1000. The display device 1000 includes a liquid crystal display panel 1200 and a main body 1100. The liquid crystal display panel 1200 is disposed on/in the main body 1100.

In an optional embodiment of the present application, the display device 1000 is a virtual reality (VR) display device.

It is understood that, in other embodiments, the type of the display device 1000 is not limited to the VR display device.

The liquid crystal display panel 1200 includes an array substrate, a color filter substrate, and liquid crystal, and the liquid crystal is located between the array substrate and the color filter substrate.

The display mode of the liquid crystal display panel 1200 may be one of FFS mode, IPS mode, and VA mode.

In an optional embodiment of the present application, the display mode of the liquid crystal display panel 1200 is the FFS mode. Specifically, the array substrate includes a substrate, a driving circuit layer located above the substrate, and a first electrode and a second electrode formed on the driving circuit layer. The second electrode is located on the driving circuit layer, and the first electrode is opposite to the second electrode. The first electrode and the second electrode are separated by an insulating layer. The first electrode is located above the second electrode. That is, the first electrode is a top electrode, and the second electrode is a bottom electrode.

When the first electrode is a common electrode, the second electrode is electrically connected to the driving circuit layer. When the first electrode is a pixel electrode, the first electrode is electrically connected to the driving circuit layer.

In other embodiments, when the first electrode is a pixel electrode, the second electrode is a common electrode, and the second electrode may also be disposed in the driving circuit layer.

In another optional embodiment of the present application, the display mode of the liquid crystal display panel 1200 is an IPS mode, and the first electrode and the second electrode of the array substrate are both disposed on the driving circuit layer and on the same layer.

In another optional embodiment of the present application, a display mode of the liquid crystal display panel is a VA mode. The first electrode of the array substrate is a pixel electrode and is formed on the driving circuit layer, and the second electrode is located in the color filter substrate.

Figure 2:
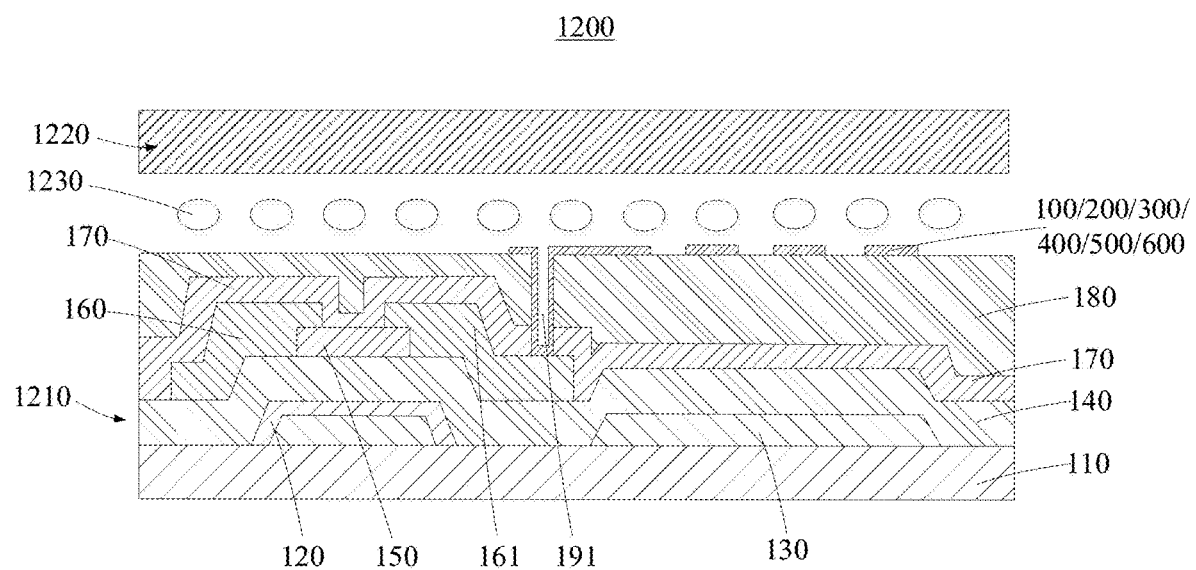
FIG. 2 is a cross-sectional view of a liquid crystal display panel according to a preferred embodiment of the present application.
Figure 3:
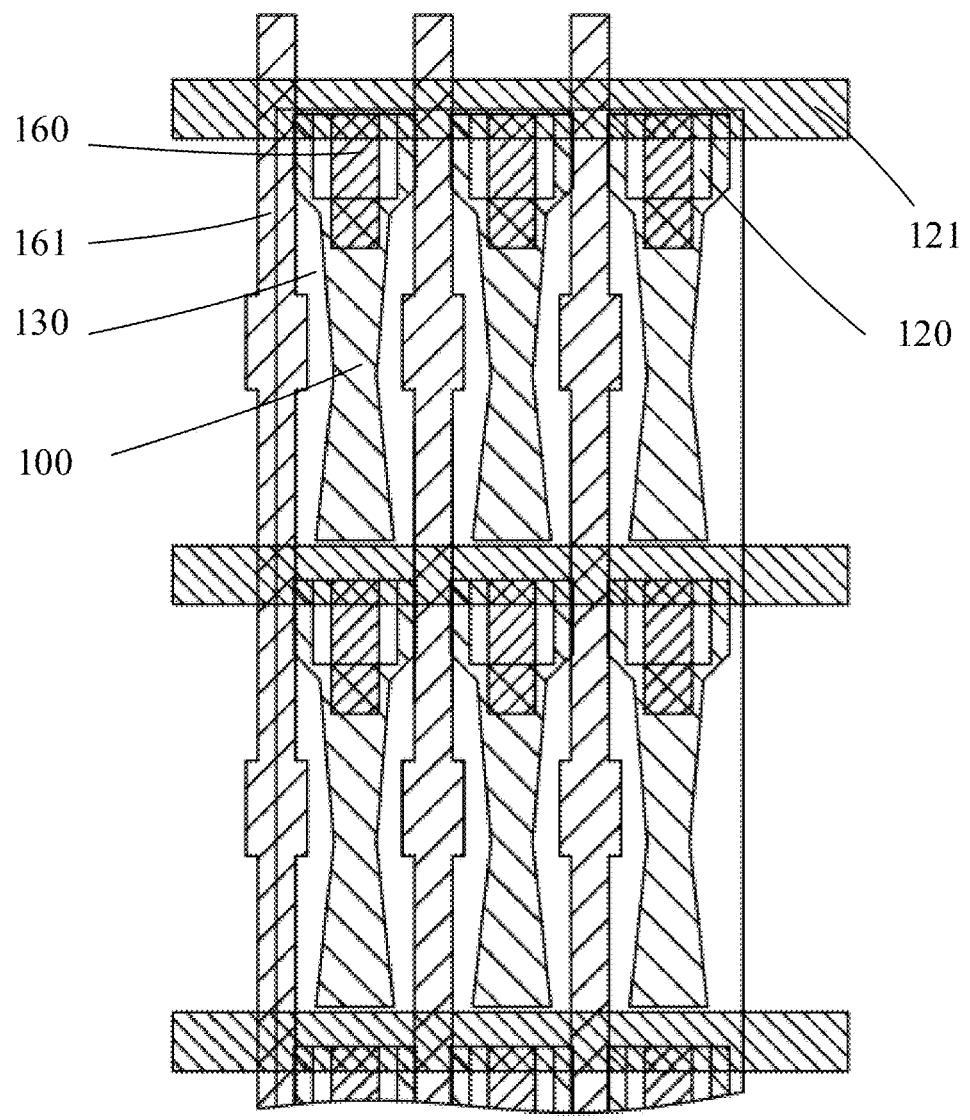
FIG. 3 illustrates a simplified layout diagram of a driving circuit of an array substrate.

Specifically, referring to FIG. 2 and FIG. 3, the structure of the liquid crystal display panel 1200 shown in FIG. 2 and the simplified layout diagram of a driving circuit of an array substrate shown in FIG. 3 are taken as examples to briefly describe the structures of the liquid crystal display panel 1200 and the array substrate 1210 and the positions of the first electrodes 100.

In FIG. 2, the liquid crystal display panel 1200 includes an array substrate 1210, a color filter substrate 1220, and a liquid crystal 1230, and the liquid crystal 1230 is located between the array substrate 1210 and the color filter substrate 1220.

In FIG. 2, the display mode of the liquid crystal display panel 1200 is the FFS mode. The array substrate 1210 includes a substrate 110, a driving circuit layer located above the substrate 110, a first electrode 100 formed on the driving circuit layer, and a second electrode 130 formed in the driving circuit layer. The first electrode 100 is opposite to the second electrode 130. The first electrode 100 is located above the second electrode 130. The first electrode 100 and the second electrode 130 are insulated. In this embodiment, the first electrode 100 is a pixel electrode.

The driving circuit layer includes a plurality of driving transistors. Each of the driving transistors includes a gate 120 formed on the substrate 110, a gate insulating layer 140 formed on the substrate 110 and covering the gate electrode 120, an active layer 150 formed on the gate insulating layer 140 and opposite to the gate 120, source and drain electrodes 160 formed on the gate insulating layer 140 and are respectively electrically connected to the active layer 150, a passivation layer 170 formed on the gate insulating layer 140 and covering the source and drain electrodes 160 and the active layer 150 exposed from the source and drain electrodes 160, and a planarization layer 180 layer 180 formed on the passivation layer 170. The second electrode 130 is formed on the substrate 110 and covered by the gate insulating layer 140. The first electrode 100 is formed on the planarization layer 180 and is opposite to the second electrode 130. The first electrode 100 is electrically connected to the source and drain electrodes 160. In this embodiment, the first electrode 100 and the source and drain electrodes 160 are electrically connected through via holes 191.

Referring to FIG. 3, in this embodiment, the array substrate 1210 further includes a plurality of scan lines 121 and a plurality of data lines 161. The scan lines 121 are disposed in the same layer as the gate electrode 120 and are electrically connected to the gate electrode 120. The data lines 161 are disposed in the same layer as the source and drain electrodes 160 and are electrically connected to the source and drain electrodes 160. The scan lines 121 are used for providing scan signals for the driving transistors, and the data lines 161 are used for providing data signals for the driving transistors. A plurality of scan lines 151 and a plurality of data lines 161 are arranged in an array, the plurality of scan lines 151 are arranged along rows, and the plurality of data lines 161 are arranged along columns. A plurality of sub-pixel areas surrounded by a plurality of scan lines 151 and a plurality of data lines 161. The first electrode 100 is located in the sub-pixel area, the first electrode 100 is a pixel electrode, and the second electrode 130 is a common electrode. The first electrode 100 is positioned opposite to the second electrode 130 to form an electric field for driving the liquid crystal 1230 to deflect.

It can be understood that, in other embodiments, the structure of the array substrate 1210 is not limited to the structure described above.

In this embodiment, the first electrode 100 is shaped like a fish, the second electrode 130 is a sheet electrode, and one of the common electrodes may correspond to one or more pixel electrodes.

The extending direction of the scan lines 121 is defined as the first direction Y1, and the extending direction of the data lines 161 is defined as the second direction Y2.

Figure 4:
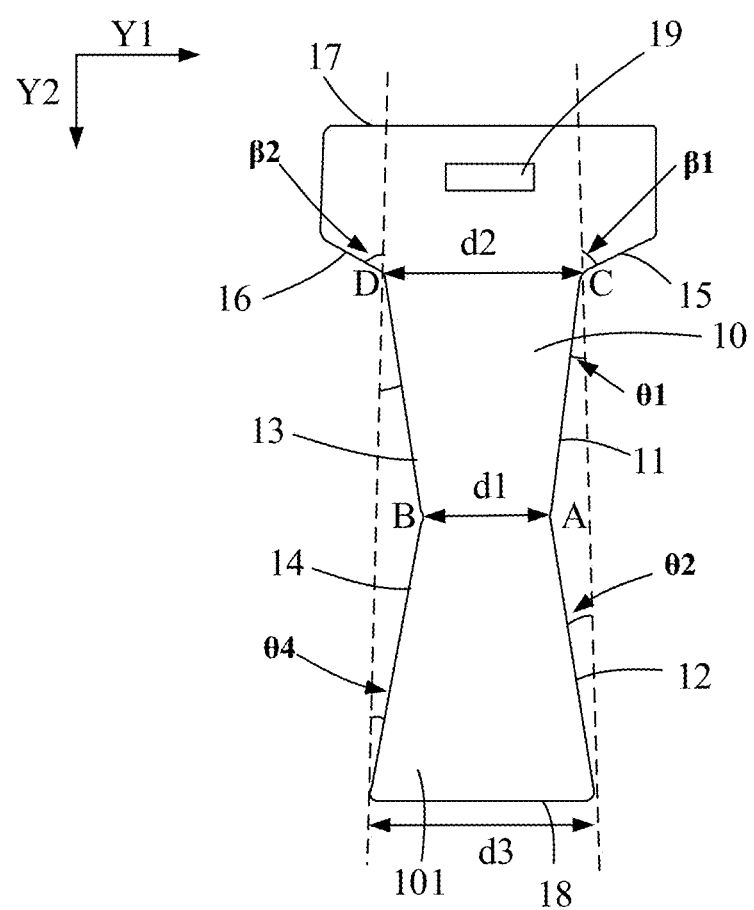
FIG. 4 is a top view of an electrode (pixel electrode) according to a first embodiment of the present application.

Referring to FIG. 4, the first electrode 100 includes a solid part 10. In this embodiment, the first electrode 100 is a pixel electrode, that is, the first electrode 100 only includes the solid part 10.

Specifically, the solid part 10 includes a first surface 101 and a second surface (not shown) opposite to the first surface 101. The second surface is in contact with the planarization layer 180. The distance between the first surface 101 and the second surface is the thickness of the solid part 10 (the first electrode 100).

Specifically, the solid part 10 further includes a first side wall 11, a second side wall 12, a third side wall 13, and a fourth side wall 14. The first side wall 11, the second side wall 12, the third side wall 13, and the fourth side wall 14 are respectively connected to the first surface 101 and are on different planes from the first surface 101.

On the first surface 101, the first side wall 11 and the second side wall 12 are defined to intersect at point A to form a first waist 101, and the third side wall 13 and the fourth side wall 14 are defined to intersect at point B to form the second waist 102. That is, the point A is a common end point of the first side wall 11 and the second side wall 12, and the point B is a common end point of the third side wall 13 and the fourth side wall 14.

On the first surface 101, the end point of the other end of the first side wall 11 away from the point A is defined as C, the end point of the other end of the second side wall away from the point A is defined as E, the end point of the other end of the third side wall 13 away from the point B is defined as D, and the end point of the other end of the fourth side wall 14 away from the point B is defined as F.

The line connecting the point A and the point B, the line connecting the point C and the point D, and the line connecting the point E and the point F are all parallel to the first direction Y1. That is, the angles between the connection line between the A point and the B point, the connection line between the C point and the D point, and the connection line between the E point and the F point, and the first direction Y1 are all 0 degrees.

A shortest distance from the first waist to the second waist is defined as d1, a distance from an end of the first side wall away from the second side wall to an end of the third side wall away from the fourth side wall is defined as d2, a distance from an end of the second side wall away from the first side wall to an end of the fourth side wall away from the third side wall is defined as d3, and d1<d2 and d1<d3.

In this embodiment, the distance from the point A to the point B is d1, the distance from the point C to the point D is d2, and the distance from the point E to the point F is d3.

In this embodiment, the connection between the first side wall 11 and the second side wall 12 and the connection between the third side wall 13 and the fourth side wall 14 are all smooth connections. That is, the intersection of the first side wall 11 and the second side wall 12 and the intersection of the third side wall 13 and the fourth side wall 14 do not form a sharp corner.

In this embodiment, the first side wall 11, the second side wall 12, the third side wall 13, and the fourth side wall 14 are all vertically connected to the first surface 101.

In an optional embodiment of the present application, the first side wall 11 is symmetrical with the third side wall 13, and the second side wall 12 is symmetrical with the fourth side wall 14.

An angle between the first side wall 11 and the second direction Y2 is defined as a first inclination angle $\theta 1$, an angle between the second side wall 12 and the second direction Y2 is defined as a second inclination angle $\theta 2$, an angle between the third side wall 13 and the second direction Y2 is defined as a third inclination angle $\theta 3$, an angle between the fourth side wall 14 and the second direction Y2 is defined as a fourth inclination angle $\theta 4$. $\theta 1$, $\theta 2$, $\theta 3$, and $\theta 4$ are all tilt angles of the first electrode 100.

Value ranges of $\theta 1$, $\theta 2$, $\theta 3$, and $\theta 4$ are all 3 degrees to 35 degrees. Preferably, the value ranges of $\theta 1$, $\theta 2$, $\theta 3$, and $\theta 4$ are all 5 degrees to 15 degrees.

Because the response time decreases with the increase of the electrode inclination angle, and the transmittance first increases and then decreases with the increase of the electrode inclination angle. Considering the relationship between the response time and the transmittance and the electrode inclination angle, the present application sets the value range of the first inclination angle to be between 3 degrees and 35 degrees. This can reduce the ineffective electric field component and the electric field disorder area while taking into account the corresponding time, reduce the area of the display dark area, and thus improve the transmittance.

In an optional embodiment of the present application, $\theta 1$, $\theta 2$, $\theta 3$, and $\theta 4$ satisfy: $\theta 1=\theta 3$ and $\theta 2=\theta 4$. Preferably, the first side wall 11 is symmetrical with the third side wall 13, and the second side wall 12 is symmetrical with the fourth side wall 14.

In an optional embodiment of the present application, $\theta 1$, $\theta 2$, $\theta 3$, and $\theta 4$ satisfy: $\theta 1=\theta 3$ and $\theta 2=\theta 4$. Preferably, the first side wall 11 is symmetrical with the third side wall 13, and the second side wall 12 is symmetrical with the fourth side wall 14.

It can be understood that the first side wall 11 and the second side wall 12 can also be asymmetrical, for example, the lengths of the first side wall 11 and the second side wall 12 are different; the third side wall 12 13 and the fourth side wall 14 may also be asymmetrical, for example, the lengths of the third side wall 13 and the fourth side wall 14 are different.

In other embodiments of the present application, $\theta 1$, $\theta 2$, $\theta 3$, and $\theta 4$ may also satisfy: $\theta 1=\theta 3$ and $\theta 2=\theta 4$, $\theta 1 \neq \theta 2$ and $\theta 3 \neq \theta 4$.

Continuing to refer to FIG. 4, the solid part 10 further includes a fifth side wall 15 and a sixth side wall 16. The fifth side wall 15 is connected to the first surface 101 and is connected to an end of the first side wall 11 away from the second side wall 12. The sixth side wall 16 is connected to the first surface 101 and is connected to an end of the third side wall 13 away from the fourth side wall 14. That is, on the first surface 101, the fifth side wall 15 and the first side wall 11 intersect at point C, and the sixth side wall 16 and the third side wall 13 are compared with point D. The fifth side wall 15 and the sixth side wall 16 constitute shoulders of the first electrode 100.

In this embodiment, the connection between the fifth side wall 15 and the first side wall 11 is a smooth connection. That is, the intersection of the fifth side wall 15 and the first side wall 11 does not form a sharp corner. The connection between the sixth side wall 16 and the third side wall 13 is a smooth connection. That is, the intersection of the sixth side wall 16 and the third side wall 13 does not form a sharp corner.

An included angle between the fifth side wall 15 and the second direction Y2 is defined as a fifth inclination angle $\beta 1$. An included angle between the sixth side wall 16 and the second direction Y2 is defined as a sixth inclination angle $\beta 2$. The value ranges of $\beta 1$ and $\beta 2$ are defined as 0 degrees and 90 degrees. Preferably, the value ranges of the $\beta 1$ and the $\beta 2$ are both 45 degrees to 60 degrees.

Setting the value ranges of $\beta 1$ and $\beta 2$ to be 0 degrees to 90 degrees can avoid dark domains caused by an excessively large angle between the fifth side wall 15 and the first side wall 11 (That is, it is avoided to form an oblique angle between the fifth side wall 15 and the first side wall 11, the existence of the oblique angle will generate a dark domain, and the dark domain will reduce the transmittance of the electrode). Thus, the loss of the transmittance of the first electrode 100 due to dark domains is avoided.

In an optional embodiment of the present application, $\beta 1$ and $\beta 2$ may satisfy: $\beta=\beta 2$. Preferably, the fifth side wall 15 is symmetrical with the sixth side wall 16.

In another embodiment of the present application, $\beta 1$ and $\beta 2$ may satisfy: $\beta \neq \beta 2$.

In an optional embodiment of the present application, the distance from the ends of the fifth side wall 15 and the sixth side wall 16 away from the first side wall 11 and the third side wall 13 is greater than the distance d2 from the point C to the point D.

Continuing to refer to FIG. 4, the solid part 10 further includes a seventh side wall 17. The seventh side wall 17 is connected with the first surface 101, the fifth side wall 15, and the sixth side wall 16 respectively. The seventh side wall 17 constitutes the head of the first electrode 100.

In this embodiment, the connection between the seventh side wall 17, the fifth side wall 15, and the sixth side wall 16 is a smooth connection. That is, the intersection of the seventh side wall 17 with the fifth side wall 15 and the sixth side wall 16 does not form a sharp corner.

In this embodiment, the seventh side wall 17 is a curved surface composed of three side walls. In other embodiments, the seventh side wall 17 may also be a plane composed of one side wall or a curved surface composed of two or more side walls.

Continuing to refer to FIG. 4, the solid part 10 further includes an eighth side wall 18. The eighth side wall 18 is connected with the first surface 101, the second side wall 12, and the fourth side wall 14, respectively. The seventh side wall 17 and the eighth side wall 18 are located at both ends of the solid part 10.

In this embodiment, the connection between the eighth side wall 18, the second side wall 12, and the fourth side wall 14 is a smooth connection. That is, the intersection of the eighth side wall 18 with the second side wall 12 and the fourth side wall 14 does not form a sharp corner.

In this embodiment, the eighth side wall 18 may also be a plane composed of one side wall. In other embodiments, the eighth side wall 18 may also be a curved surface composed of at least two side walls.

Continuing to refer to FIG. 4, the first electrode 100 further includes a connection terminal 19. The connection terminal 19 is formed on the solid part 10, and the connection terminal 19 serves as a signal output or input port of the first electrode 100. In this embodiment, the connection terminal 19 is located adjacent to the seventh side wall 17.

Figure 5:
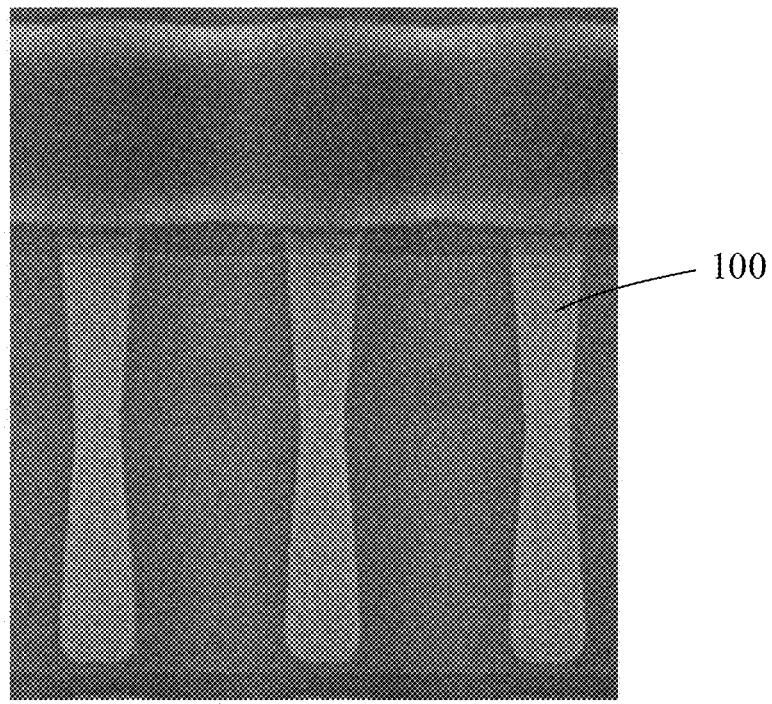
FIG. 5 is a real topography diagram of the electrode shown in FIG. 4.
Figure 6:
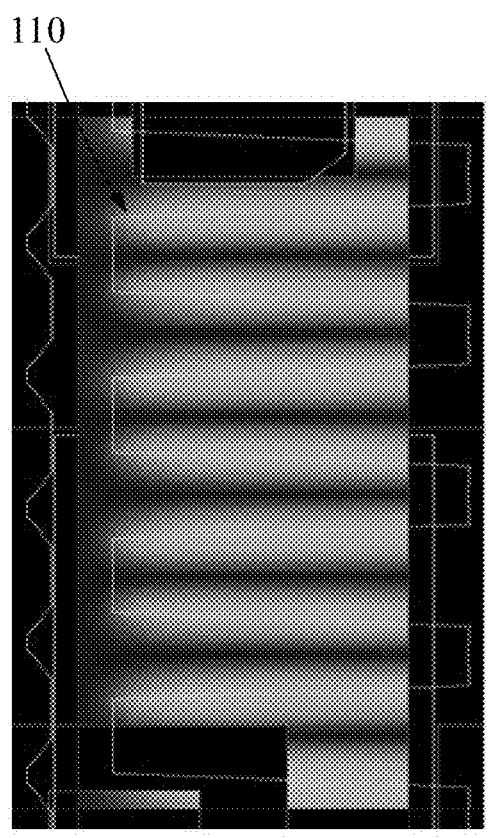
FIG. 6 is a simulated light effect diagram of a comb-shaped electrode in the prior art.
Figure 7:
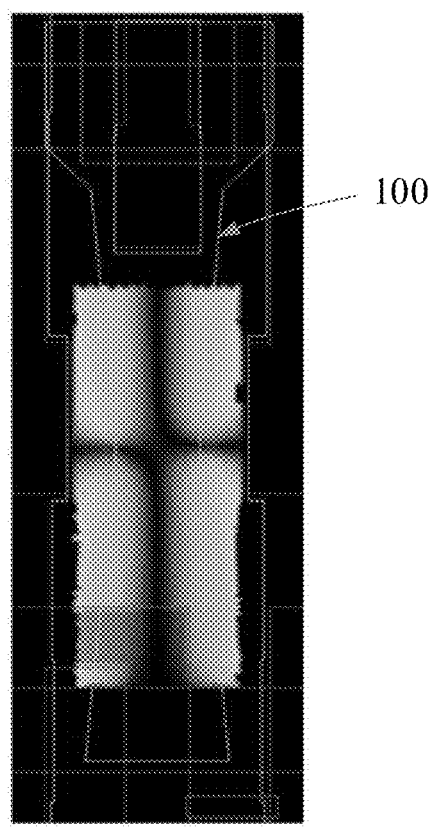
FIG. 7 is a simulated light effect diagram of the electrode shown in FIG. 4.

Referring to FIG. 5, FIG. 6, and FIG. 7, FIG. 5 is a real topography view of the electrode shown in FIG. 4. FIG. 6 is a simulated light effect diagram of a comb-shaped electrode in the prior art. FIG. 7 is a simulated light effect diagram of the electrode according to the present application. It can be seen from FIG. 6 and FIG. 7 that the light efficiency of the first electrode 100 provided by the present application shown in FIG. 7 is better than that of the comb-shaped electrode shown in FIG. 6. The transmittance of the first electrode 100 provided in the present application is higher than that of the comb-shaped electrode. Specifically, through simulation, it can be concluded that the light efficiency of the first electrode 100 provided by the present application is more than 50% better than that of the comb-shaped electrode in the prior art. That is, the transmittance of the first electrode 100 provided by the present application is higher than that of the comb-shaped electrode in the prior art.

Figure 8:
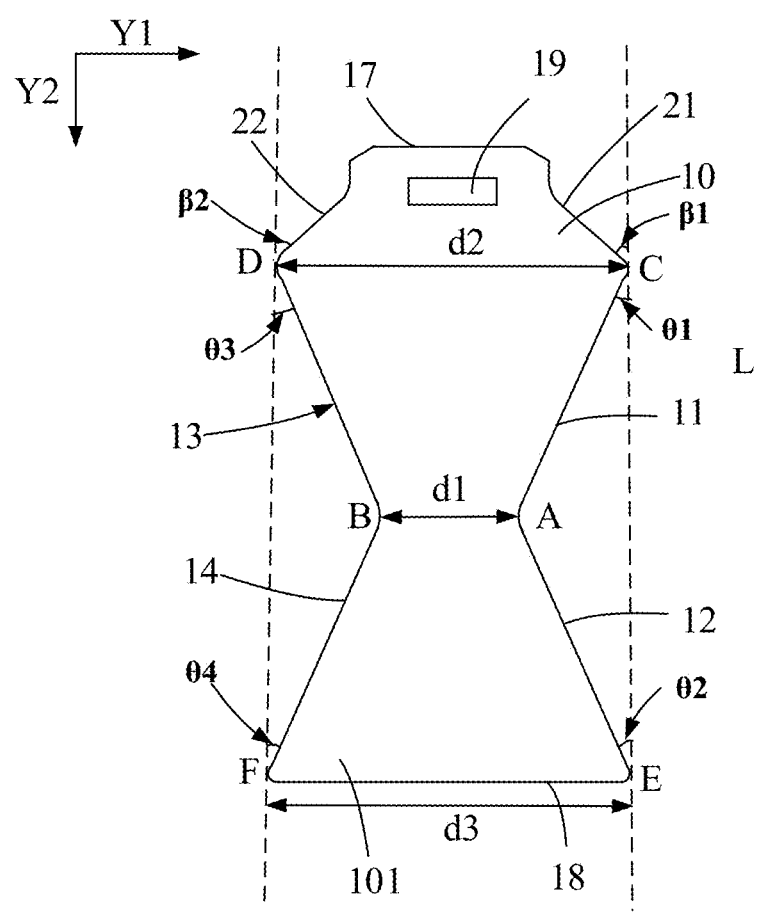
FIG. 8 is a top view of an electrode (pixel electrode) according to a second embodiment of the present application.

Referring to FIG. 8, the second embodiment of the present application further provides a first electrode 200. The structure of the first electrode 200 is similar to that of the first electrode 100, and the difference is only in that the distance from ends of the fifth side wall 21 and the sixth side wall 22 of the first electrode 200 away from the first side wall 11 and the third side wall 13 is less than the distance d2 from the point C to the point D.

It can be understood that, in other embodiments, the distances between the ends of the fifth side wall 21 and the sixth side wall 22 of the first electrode 200 away from the first side wall 11 and the third side wall 13 may also be equal to the distance d2 from the point C to the point D.

Figure 9:
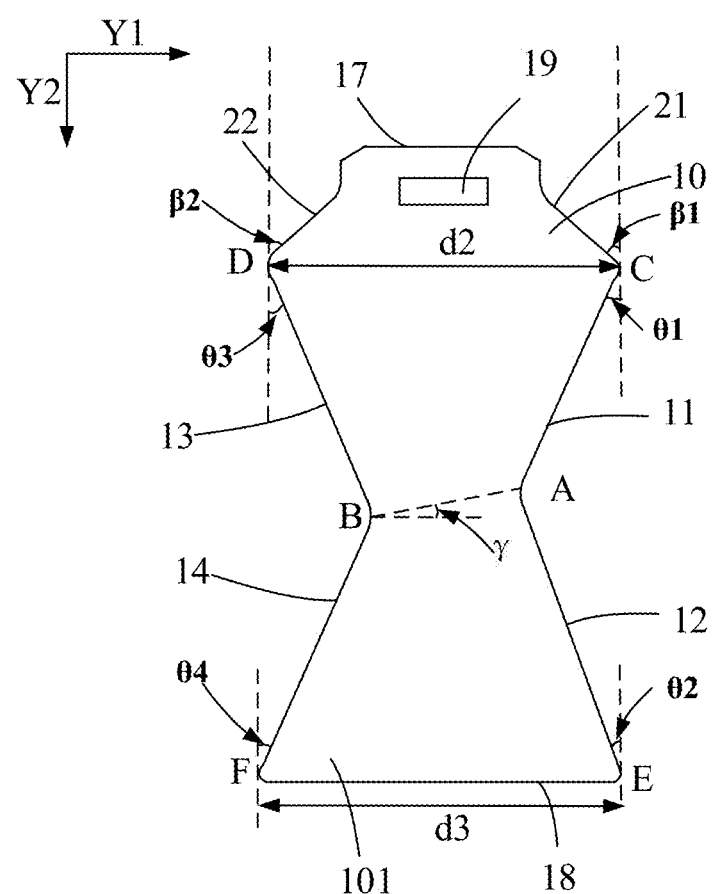
FIG. 9 is a top view of an electrode (pixel electrode) according to a third embodiment of the present application.

Referring to FIG. 9, the third embodiment of the present application further provides a first electrode 300. The structure of the first electrode 300 is similar to that of the first electrode 200, and the difference is only in that the first waist 101 and the second waist 102 of the first electrode 300 are asymmetrical. That is, the included angle γ between the line connecting the point A and the point B and the first direction Y1 is greater than 0 degrees.

Because the first waist 101 and the second waist 102 are asymmetrical, the first electrode 300 has a first group of inclination angles and a second group of inclination angles. This can not only increase the selectable range of the inclination angle of the first electrode 300, but also avoid the mutual interference area of liquid crystal rotation disorder, reduce dark domains, and improve transmittance.

Figure 10:
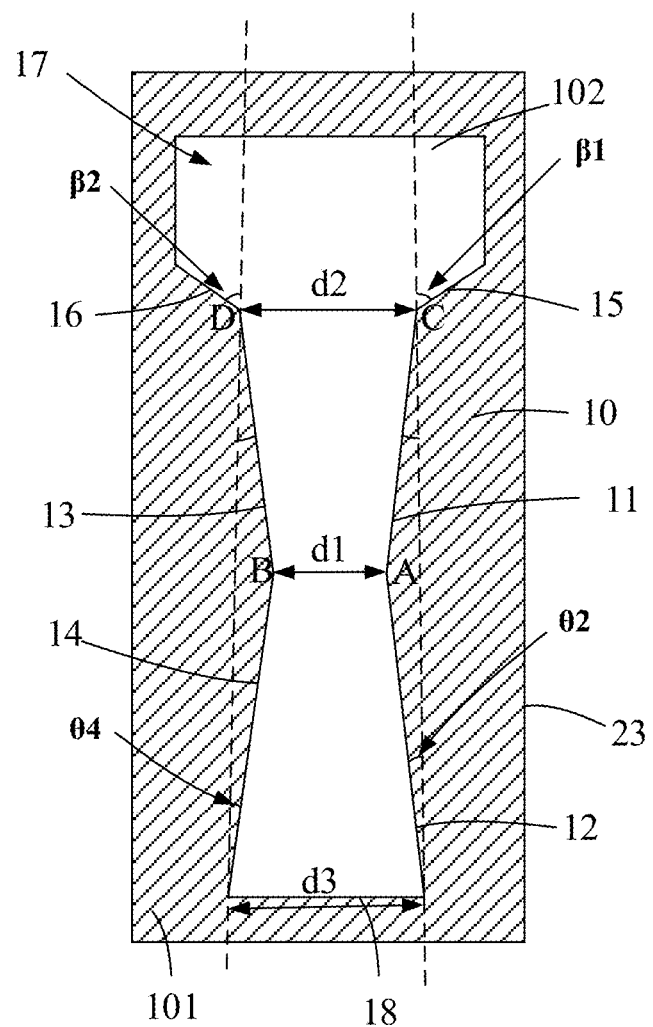
FIG. 10 is a top view of an electrode (pixel electrode) according to a fourth embodiment of the present application.

Referring to FIG. 10, the fourth embodiment of the present application further provides a first electrode 400. The structure of the first electrode 400 is similar to that of the first electrode 100, and the difference is only in that the first electrode 400 is a common electrode, and a cavity 102 is formed in the solid part 10 of the first electrode 400. The first side wall 11, the second side wall 12, the third side wall 13, the fourth side wall 14, the fifth side wall 15, the sixth side wall 16, the seventh side wall 17, and the eighth side wall 18 are inner walls of the cavity 102. The solid part 10 of the first electrode 300 further includes an outer sidewall 23. The outer side wall 23 surrounds the first side wall 11, the second side wall 12, the third side wall 13, the fourth side wall 14, the fifth side wall 15, the sixth side wall 16, the seventh side wall 17, and the eighth side wall 18 are provided and are the outer walls of the solid part 10.

In an optional embodiment of the present application, the cavity 102 is shaped like a fish.

Figure 11:
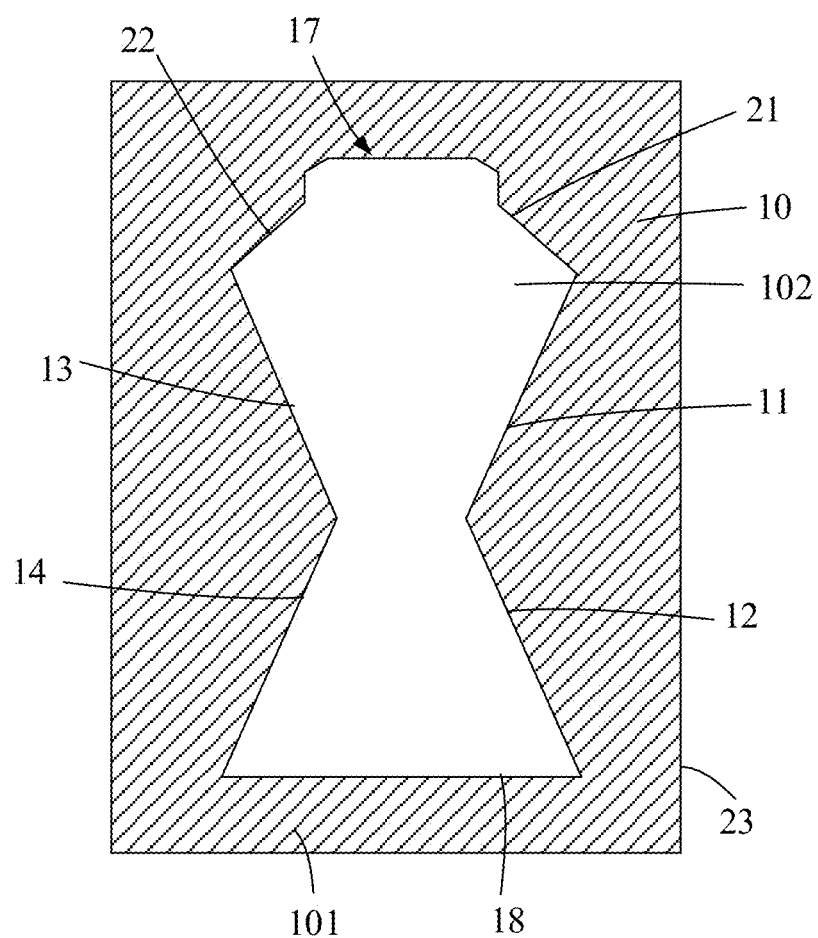
FIG. 11 is a top view of an electrode (common electrode) according to a fifth embodiment of the present application.

Referring to FIG. 11, the fifth embodiment of the present application further provides a first electrode 500. The structure of the first electrode 500 is similar to that of the first electrode 400, and the difference is only in that the distance from ends of the fifth side wall 21 and the sixth side wall 22 of the first electrode 4500 away from the first side wall 11 and the third side wall 13 is less than the distance d2 from the point C to the point D.

It can be understood that, in other embodiments, the distance between the ends of the fifth side wall 21 and the sixth side wall 22 of the first electrode 400 away from the first side wall 11 and the third side wall 13 can also be equal to the distance d2 from the point C to the point D.

Figure 12:
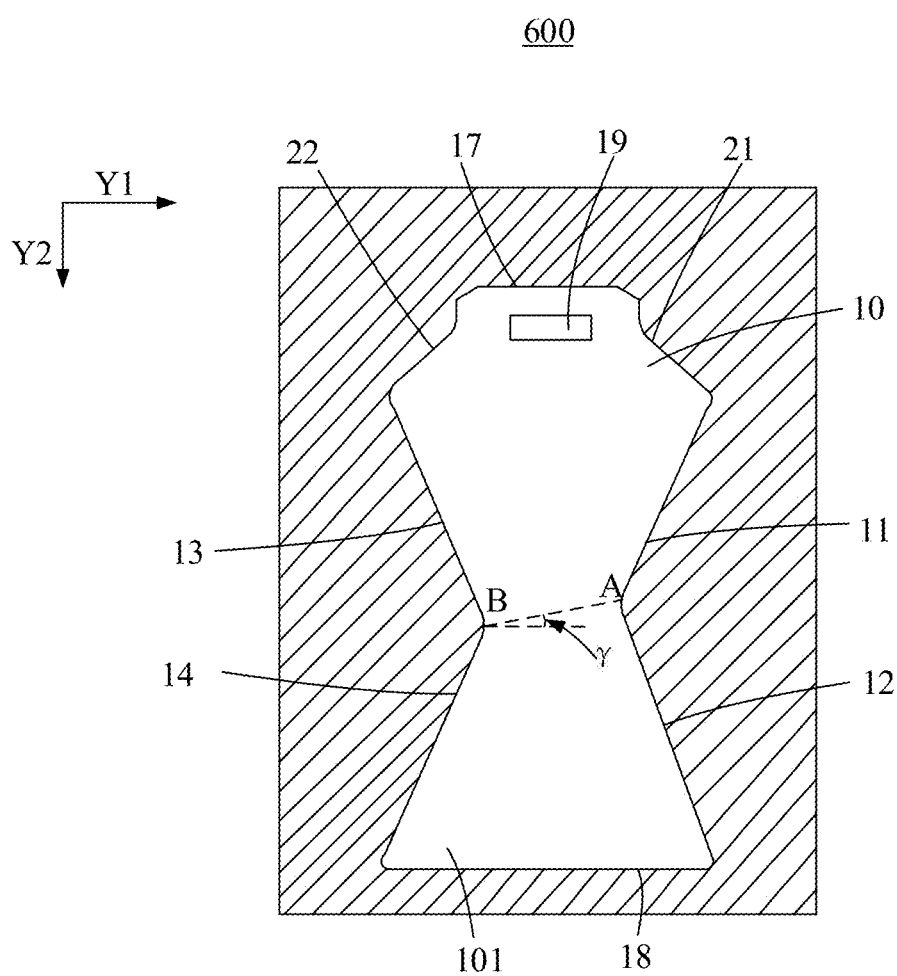
FIG. 12 is a top view of an electrode (common electrode) according to a sixth embodiment of the present application.

Referring to FIG. 12, the sixth embodiment of the present application further provides a first electrode 600. The structure of the first electrode 600 is similar to that of the first electrode 400, and the difference is only in that the first waist 101 and the second waist 102 of the first electrode 600 are asymmetrical. That is, the included angle γ between the line connecting the point A and the point B and the first direction Y1 is greater than 0 degrees.

Because the first waist 101 and the second waist 102 are asymmetrical, the first electrode 600 has a first set of inclination angles and a second set of inclination angles. This can not only increase the selectable range of the inclination angle of the first electrode 600, but also avoid the mutual interference area of liquid crystal rotation disorder, reduce dark domains, and improve transmittance.

In an optional embodiment of the present application, the first electrodes 100/200/300/400/500/600 are top electrodes. It can be understood that the first electrodes 100/200/300/ 400/500/600 can also be used as bottom electrodes. However, the transmittances when the first electrodes 100/200/ 300/400/500/600 are used as the bottom electrodes are lower than that when the first electrodes 100/200/300/400/500/600 are used as the top electrodes.

In the electrode, the liquid crystal display panel, and the display device provided by the present application, 1) a shape of the electrode is designed such that the solid part of the electrode includes the first side wall, the second side wall, the third side wall, and the fourth side wall. On the first surface, the first side wall and the second side wall intersect at the point A, and the third side wall and the fourth side wall intersect at the point B. The distance from the point A to the point B is smaller than the distance between the ends of the first side wall and the third side wall away from the point A and the point B and is smaller than the distances from the ends of the second side wall and the fourth side wall away from the point A and the point B. Accordingly, dimensions at the intersection of the first side wall and the second side wall and the intersection of the third side wall and the fourth side wall are relatively shrunk. This forms a fish-like electrode. An inactive electric field component and an electric field disturbance area can be reduced by changing the shape of the first electrode. In turn, an area of a dark area of the display is reduced, so as to improve a transmittance while taking into account the response time. 2) Since the response time decreases with the increase of the electrode inclination angle, the transmittance first increases and then decreases with the increase of the electrode inclination angle. Therefore, setting the value of the inclination angle of the first electrode between 3 degrees and 35 degrees can not only improve the transmittance of the display panel, but also have a better response time. This meets the requirements of the VR display device. 3) When the first electrode provided in the present application is a pixel electrode, the waist of the electrode shrinks. Thus, the distance between two adjacent electrodes is increased, thereby reducing the risk of cross-linking of adjacent electrodes during exposure and development process.

To sum up, although the present application has disclosed the above-mentioned preferred embodiments, the above-mentioned preferred embodiments are not intended to limit the present application. Those skilled in the art can make various changes and modifications without departing from the spirit and scope of the present application. Therefore, the protection scope of the present application is subject to the scope defined by the claims.

What is claimed is:

1. An array substrate, comprising:
   a driving circuit layer and a first electrode located on the driving circuit layer; wherein the driving circuit layer comprises a plurality of scan lines and a plurality of data lines, and the first electrode is located in a sub-pixel area surrounded by the plurality of the scan lines and the plurality of the data lines; wherein an extension direction of the scan lines is defined as a first direction, and an extension direction of the data lines as a second direction; wherein the first electrode further comprises a solid part; wherein the solid part further comprises:
   a first side wall and a second side wall; wherein the first side wall intersects with an end of the second side wall to form a first waist; and
   a third side wall and a fourth side wall; wherein the third side wall intersects with an end of the fourth side wall to form a second waist;
   wherein a shortest distance from the first waist to the second waist is defined as d1, a distance from an end of the first side wall away from the second side wall to an end of the third side wall away from the fourth side wall is defined as d2, a distance from an end of the second side wall away from the first side wall to an end of the fourth side wall away from the third side wall is defined as d3, and d1<d2 and d1<d3;
   wherein the solid part comprises a first surface disposed parallel to and away from the driving circuit layer, the first side wall, the second side wall, the third side wall, and the fourth side wall are respectively connected to the first surface and are on different planes from the first surface;
   wherein on the first surface, the first side wall and the second side wall are defined to intersect at the point A, the third side wall and the fourth side wall are defined to intersect at the point B, and an angle between the line connecting the point A and the point B and the first direction is greater than 0 degrees;
   wherein the sub-pixel area comprises one pixel electrode, and the one pixel electrode only comprises the first electrode, and the first waist and the second waist of the first electrode are asymmetrical.

2. The array substrate according to claim 1, wherein the first electrode further comprises a cavity in the solid part, and the first side wall, the second side wall, the third side wall, and the fourth side wall are inner walls of the cavity.

3. The array substrate according to claim 2, wherein the solid part further comprises an outer side wall, the outer side wall is arranged around the first side wall, the second side wall, the third side wall, and the fourth side wall, and the outer side wall is an outer wall of the solid part.

4. The array substrate according to claim 1, wherein an angle between the first side wall and the second direction is defined as a first inclination angle $\theta 1$, an angle between the second side wall and the second direction is defined as a second inclination angle $\theta 2$, an angle between the third side wall and the second direction is defined as a third inclination angle $\theta 3$, an angle between the fourth side wall and the second direction is defined as a fourth inclination angle $\theta 4$, and value ranges of $\theta 1$, $\theta 2$, $\theta 3$, and $\theta 4$ are all 3 degrees to 35 degrees.

5. The array substrate according to claim 4, wherein the value ranges of $\theta 1$, $\theta 2$, $\theta 3$, and $\theta 4$ are all 5 degrees to 15 degrees.

6. The array substrate according to claim 4, wherein $\theta 1 = \theta 3$ and $\theta 2 = \theta 4$.

7. The array substrate according to claim 6, wherein $\theta 1 \neq \theta 2$ and $\theta 3 \neq \theta 4$.

8. The array substrate according to claim 1, wherein the solid part further comprises:
   a fifth side wall connected to the end of the first side wall away from the second side wall; and
   a sixth side wall, connected to the end of the third side wall away from the fourth side wall;
   an angle between the fifth side wall and the second direction is defined as a fifth inclination angle $\beta 1$, an angle between the sixth side wall and the second direction is a sixth inclination angle $\beta 2$, and value ranges of $\beta 1$ and $\beta 2$ are both 0 degrees to 90 degrees.

9. The array substrate according to claim 8, wherein the value ranges of $\beta 1$ and $\beta 2$ are both 45 degrees to 60 degrees.

10. The array substrate according to claim 8, wherein the solid part further comprises:
    a seventh side wall connected to the fifth side wall and the sixth side wall, respectively; and
    an eighth side wall connected to the second side wall and the fourth side wall, respectively;
    wherein the eighth side wall and the seventh side wall are located at two ends of the solid part.

11. The array substrate according to claim 1, wherein the array substrate further comprises a substrate and a second electrode opposite to the first electrode, the second electrode is located within the driving circuit layer or on the driving circuit layer, the driving circuit layer is located on the substrate, and the second electrode is located between the substrate and the first electrode.

12. A liquid crystal display panel, comprising:
liquid crystal and a color filter substrate, wherein the liquid crystal display panel further comprises an array substrate, and the liquid crystal is located between the color filter substrate and the array substrate; wherein the array substrate comprises a driving circuit layer and a first electrode located on the driving circuit layer; wherein the driving circuit layer comprises a plurality of scan lines and a plurality of data lines, and the first electrode is located in a sub-pixel area surrounded by the plurality of the scan lines and the plurality of the data lines; wherein an extension direction of the scan lines is defined as a first direction, and an extension direction of the data lines as a second direction; wherein the first electrode further comprises a solid part; wherein the solid part further comprises:
a first side wall and a second side wall; wherein the first side wall intersects with an end of the second side wall to form a first waist; and
a third side wall and a fourth side wall; wherein the third side wall intersects with an end of the fourth side wall to form a second waist;
wherein a shortest distance from the first waist to the second waist is defined as d1, a distance from an end of the first side wall away from the second side wall to an end of the third side wall away from the fourth side wall is defined as d2, a distance from an end of the second side wall away from the first side wall to an end of the fourth side wall away from the third side wall is defined as d3, and d1<d2 and d1<d3;
wherein the solid part comprises a first surface disposed parallel to and away from the driving circuit layer, the first side wall, the second side wall, the third side wall, and the fourth side wall are respectively connected to the first surface and are on different planes from the first surface;
wherein on the first surface, the first side wall and the second side wall are defined to intersect at the point A, the third side wall and the fourth side wall are defined to intersect at the point B, and an angle between the line connecting the point A and the point B and the first direction is greater than 0 degrees;
wherein the sub-pixel area comprises one pixel electrode, and the one pixel electrode only comprises the first electrode, and the first waist and the second waist of the first electrode are asymmetrical.

13. The liquid crystal display panel according to claim 12, wherein the first electrode further comprises a cavity in the solid part, and the first side wall, the second side wall, the third side wall, and the fourth side wall are inner walls of the cavity.

14. The liquid crystal display panel according to claim 12, wherein an angle between the first side wall and the second direction is defined as a first inclination angle $\theta 1$, an angle between the second side wall and the second direction is defined as a second inclination angle $\theta 2$, an angle between the third side wall and the second direction is defined as a third inclination angle $\theta 3$, an angle between the fourth side wall and the second direction is defined as a fourth inclination angle $\theta 4$, and value ranges of $\theta 1$, $\theta 2$, $\theta 3$, and $\theta 4$ are all 3 degrees to 35 degrees.

15. A display device, comprising:
a liquid crystal display panel, wherein the liquid crystal display panel comprises liquid crystal and a color filter substrate, wherein the liquid crystal display panel further comprises an array substrate, and the liquid crystal is located between the color filter substrate and the array substrate; wherein the array substrate comprises a driving circuit layer and a first electrode located on the driving circuit layer; wherein the driving circuit layer comprises a plurality of scan lines and a plurality of data lines, and the first electrode is located in a sub-pixel area surrounded by the plurality of the scan lines and the plurality of the data lines; wherein an extension direction of the scan lines is defined as a first direction, and an extension direction of the data lines as a second direction; wherein the first electrode further comprises a solid part; wherein the solid part further comprises:
a first side wall and a second side wall; wherein the first side wall intersects with an end of the second side wall to form a first waist; and
a third side wall and a fourth side wall; wherein the third side wall intersects with an end of the fourth side wall to form a second waist;
wherein a shortest distance from the first waist to the second waist is defined as d1, a distance from an end of the first side wall away from the second side wall to an end of the third side wall away from the fourth side wall is defined as d2, a distance from an end of the second side wall away from the first side wall to an end of the fourth side wall away from the third side wall is defined as d3, and d1<d2 and d1<d3;
wherein the solid part comprises a first surface disposed parallel to and away from the driving circuit layer, the first side wall, the second side wall, the third side wall, and the fourth side wall are respectively connected to the first surface and are on different planes from the first surface;
wherein on the first surface, the first side wall and the second side wall are defined to intersect at the point A, the third side wall and the fourth side wall are defined to intersect at the point B, and an angle between the line connecting the point A and the point B and the first direction is greater than 0 degrees;
wherein the sub-pixel area comprises one pixel electrode, and the one pixel electrode only comprises the first electrode, and the first waist and the second waist of the first electrode are asymmetrical.

* * * * *